C. CHAMBERS, Jr., DEC'D.
M. P., S. B. & J. H. CHAMBERS, EXECUTORS.
DOUGH MIXING MACHINE.
APPLICATION FILED JULY 13, 1909.

1,005,769.

Patented Oct. 10, 1911.

WITNESSES:
Jas. C. Wobensmith
Howard S. O'Kie

INVENTOR
Cyrus Chambers Jr.
BY
ATTORNEY.

UNITED STATES PATENT OFFICE.

CYRUS CHAMBERS, JR., OF OVERBROOK, PENNSYLVANIA; MARY P. CHAMBERS, S. BERNARD CHAMBERS, AND J. HOWARD CHAMBERS EXECUTORS OF SAID CYRUS CHAMBERS, JR., DECEASED.

DOUGH-MIXING MACHINE.

1,005,769.  Specification of Letters Patent.  Patented Oct. 10, 1911.

Application filed July 13, 1909. Serial No. 507,310.

*To all whom it may concern:*

Be it known that I, CYRUS CHAMBERS, Jr., a citizen of the United States, residing at Overbrook, in the county of Montgomery and State of Pennsylvania, have invented a new and useful Dough-Mixing Machine, of which the following is a specification.

My invention relates to improvements in dough mixing machines.

The object of my invention is to provide a small machine for domestic use, which can be economically constructed and operated for working the process substantially as described in my Patent No. 852,497 dated May 7, 1907.

In several respects this machine is similar to the machine described in my Patent No. 921,361 dated May 11, 1909. The machine in said patent however being a power operated machine adapted to mix large quantities of dough at a time, while the present machine is adapted for family use, being a hand-operated machine for mixing small batches of dough.

My invention also comprises various improvements in details of construction.

Figure 1:
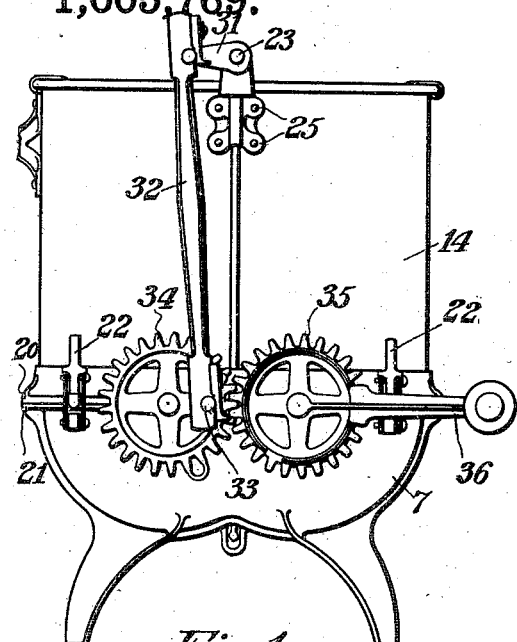
Figure 2:
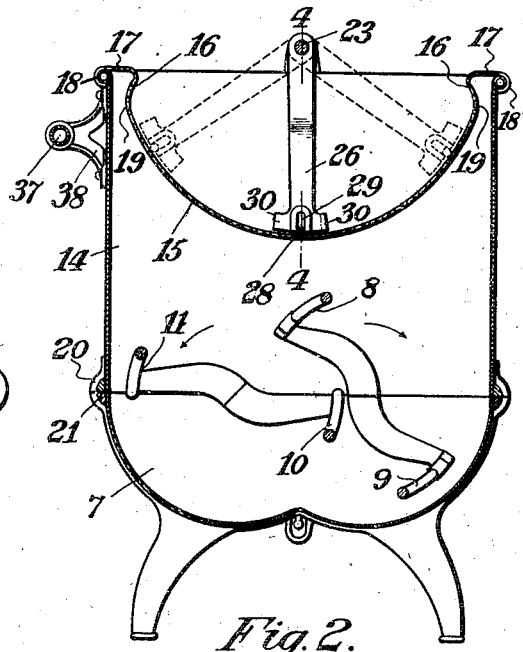
Figure 3:
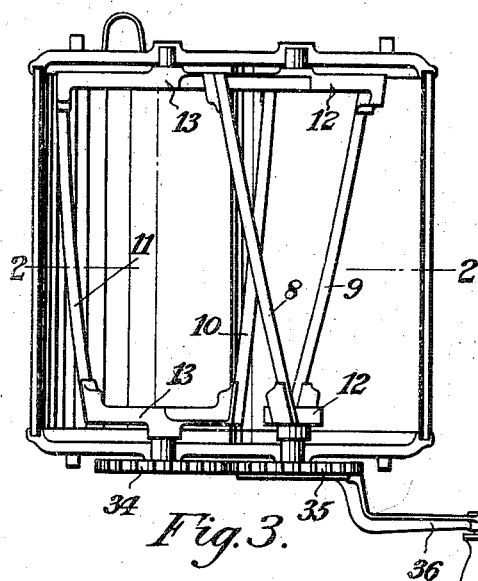
Figure 4:
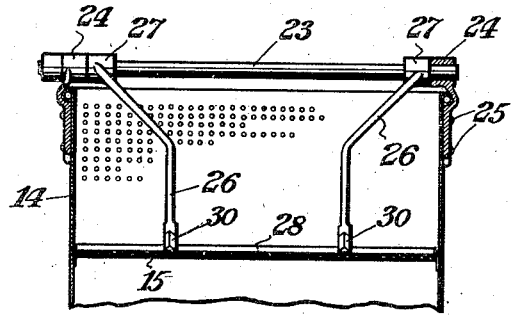
Figure 5:
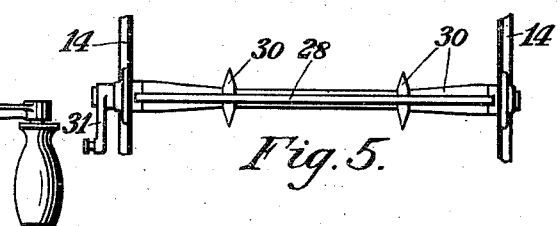

Referring to the drawings:—Figure 1 is an end elevation of my device. Fig. 2 is a vertical section on line 2—2 of Fig. 3. Fig. 3 is a plan view. Fig. 4 is a longitudinal section on line 4—4 of Fig. 2. Fig. 5 is a view of the under side of the sifter rod and associated mechanism.

Similar numerals refer to similar parts throughout the several views.

The mixing basin 7 and the spiral mixing rods 8, 9, 10 and 11 are similar to those shown in said Patent No. 921,361, and operated substantially in a similar manner. The spiders 13 carrying these spiral rods are cast directly onto the shaft integral with the gear wheels, winch and interlocking device, thereby eliminating the expense of a detachable coupling connection as described in said patent.

The air chamber 14 is made with its sides parallel and extending vertically from the outer margin of the mixing chamber so as to have a cross-section horizontal area equal to the horizontal area of the top of the mixing basin. This gives a free clear way for the discharge of flour from the sifter over the entire area of the mixing basin. Within the air chamber is suspended and secured thereto the perforated sifter 15 having a semi-circular formation from a center slightly above the top of the air chamber. This sifter extends up around and over the upper edge of the air chamber as shown in Figs. 1 and 2, especially. The body is bent inwardly on either side as at 16, and then extends horizontally as at 17, curving around the rim of the air chamber as at 18, preferably forming a permanent connection therewith. This forms a swell at either side of the sifter which serves to throw in toward the center line of the sifter, any flour that may be pushed upward by the sifter rod toward the upper edge of the sifter, and not over the rounded edge. It will be noted that the diameter of the widest part of the sifter hopper within the air chamber is considerably less than the diameter of the air chamber, and that the perforations of the sifter hopper are continued throughout swells 19 and bent-in portions 16. It will thus be clear that the flour may be sifted through parts 19 and 16 and will fall freely into the mixing chamber. The adjacent edges of the air chamber and mixing basin are provided with the reinforcing rims 20 and 21 which form large coöperating surfaces for making an efficient joint between said two members. Said reinforcing rims also serve to stiffen the body of the air chamber and the mixing basin and also contribute to sightliness of the completed structure. Any suitable catches, such as 22, serve to lock the two members together.

The rock shaft 23 is journaled in boxes 24 which journal box structures are riveted as at 25, see Fig. 4, to the end walls of the air chamber. The rock shaft thus has a middle longitudinal extension over the sifting hopper 15. These journal boxes 24 extend above the top of the air chamber and consequetly above and beyond the line to which the flour comes when the sifting hopper is full, thereby avoiding any leakage of flour through said journal boxes. The cubical capacity of the sifter hopper has preferably a capacity relative to the capacity of the mixing basin.

To the rock shaft 23 are rigidly secured the two arms 26 whose hubs 27 lie against the journal boxes 24 thus forming abutments for the end thrust thereof. The arms 26 have an inclined convergent extension toward the middle of the machine at an angle approximately forty-five degrees for about half way their extension and then perpendicularly the balance of the way as clearly shown in Fig. 4. Arms 26 are provided at their lower ends with the vertically extending slots 29 which form bearings for the sifter roller 28 about one-quarter the distance from each end. This serves to balance the strain between the middle of said bearings and their ends to relieve any tendency to strain the sifter roller which is of very small diameter. The sifter roller has a gravity engagement with the bottom of the sifter hopper and has room to move up and down in the slots 29. The lower ends of arm 26 are also provided with the plows 30, which as they move through the flour in either direction are adapted to push the flour to either side and allow free passage for the sifter roller boxes. These double plows 30 have their undersides in the segments of circles, the arc of which corresponds with the distance their lower edge is from the center of this rock shaft 23. Should the sifting roller meet with any obstructions, such as a hard lump, a nail or other hard substance, in the flour, it will hop over the same without injuring the sifter hopper, but it will always return by gravity to its normal position and the proper position for doing efficient work and yet be free to move without binding. It will thus be clear that arms 26 may be rigidly connected with rock shaft 23 instead of working in slots therein as shown in my said prior patent, and that although the sifter roller is of very small diameter, it will nevertheless be free from strain at all times, due to the bends in arms 26 and to the elongated slots 29. The reciprocating motion is given to the sifting rod through the rock shaft 23 in the usual way by the crank 31 secured to rock shaft 23 connecting rod 32 and crank 33 on one of the gear wheels 34 connecting the shafts of the spiral mixing rods, the other gear wheel 35 may be provided with the usual winch 36 for manual operation. The handle 37 is also secured by two lugs or arms 38 riveted to the side of the air chamber. This is provided for steadying the machine with one hand while the winch is being turned.

The chief improvements or differences in the present device over that shown in the patents referred to, may be enumerated as follows: the formation of the mixing hopper, giving a greater relative surface or perforated area, and providing means for preventing the flour being thrown over the edge of the hopper, namely, the perforated swells 19 spaced away from the walls of the air chamber and the perforated bent-in portions 16; the formation and disposition of the arms 26 and the slots 29 for actuating the sifting rod 28; the formation of the plows on the ends of arms 26; and the collars 27 connecting arms 26 with rock shaft 23, abutting the journal boxes 24; the means for permanently securing the sifter hopper to the air chamber; the means for securing the journal boxes of the rock shaft to the walls of the air chamber; the casting of the mixing rod spiders integral with the supporting shafts and gear wheels; the securing of the rock shaft to the air chamber instead of to the sifter hopper and other details of construction, which contribute in producing an extremely inexpensive and efficient machine for family use.

The operation of my device is as follows:—The proper quantity of yeast, milk and other suitable liquid ingredients are placed in the mixing chamber 7. The air chamber is then put in place as shown in Fig. 1, and flour is introduced into the sifter hopper 15. The winch 36 is then operated to turn the mixing rods in the mixing chamber and the rock shaft 23 is simultaneously operated through the connecting rod 32. This gives a sweep to the arms 26 and consequently the sifting rod 28, over nearly the entire curved surface of the sifter hopper. The first sweep of the rod will deliver the greatest quantity of flour to the mixing chamber, but as the operation proceeds and the level of the floor descends in the sifter hopper, the amount of flour with each oscillation of the rock shaft 23 gradually decreases, and this decrease corresponds to the gradual thickening of the mixture in the mixing chamber.

What I claim is:—

In a dough mixing machine, the combination of a mixing chamber and mixing mechanism therein, an air chamber superimposing the mixing chamber, a sifter hopper connected with the top of the air chamber having a substantially semi-circular formation, a rock shaft journaled above the top of the sifter hopper, journal boxes therefor secured to the walls of the air chamber, arms secured to the rock shaft extending part way inclined and convergent to each other and part way perpendicular to the rock shaft, having slotted ends with double ended plows having their undersides in the arc of a circle corresponding substantially to the curved contour of the sifter hopper, and a sifter rod engaging in said slotted ends.

CYRUS CHAMBERS, Jr.

Witnesses:
F. N. FINGER,
C. B. KELLER, Jr.